(12) United States Patent
Cadigan et al.

(10) Patent No.: US 11,772,979 B2
(45) Date of Patent: Oct. 3, 2023

(54) METAL-DECORATED BARIUM CALCIUM ALUMINUM OXIDE CATALYST FOR NH3 SYNTHESIS AND CRACKING AND METHODS OF FORMING THE SAME

(71) Applicants: Starfire Energy, Aurora, CO (US); Colorado School of Mines, Golden, CO (US)

(72) Inventors: Chris Cadigan, Golden, CO (US); Ryan O'Hayre, Golden, CO (US); Joseph D. Beach, Aurora, CO (US); Adam W. Welch, Aurora, CO (US); Jonathan D. Kintner, Aurora, CO (US)

(73) Assignees: Starfire Energy, Denver, CO (US); Colorado School of Mines, Golden, CO (US)

( * ) Notice: Subject to any disclaimer, the term of this patent is extended or adjusted under 35 U.S.C. 154(b) by 395 days.

(21) Appl. No.: 16/779,348

(22) Filed: Jan. 31, 2020

(65) Prior Publication Data
US 2020/0277198 A1    Sep. 3, 2020

Related U.S. Application Data

(60) Provisional application No. 62/931,537, filed on Nov. 6, 2019, provisional application No. 62/801,578, filed
(Continued)

(51) Int. Cl.
| | |
|---|---|
| *C01C 1/04* | (2006.01) |
| *B01J 23/04* | (2006.01) |
| *B01J 23/46* | (2006.01) |
| *B01J 23/75* | (2006.01) |
| *B01J 35/04* | (2006.01) |

(Continued)

(52) U.S. Cl.
CPC .............. *C01C 1/0411* (2013.01); *B01J 23/04* (2013.01); *B01J 23/462* (2013.01); *B01J 23/75* (2013.01); *B01J 35/04* (2013.01); *B01J 37/0219* (2013.01); *B01J 37/0225* (2013.01);
(Continued)

(58) Field of Classification Search
None
See application file for complete search history.

(56) References Cited

U.S. PATENT DOCUMENTS

| | | | |
|---|---|---|---|
| 2,898,183 A | 8/1959 | Giacomo | |
| 3,344,052 A | 9/1967 | Yeh | |

(Continued)

FOREIGN PATENT DOCUMENTS

| | | |
|---|---|---|
| CN | 2318593 Y | 5/1999 |
| CN | 103237599 A | 8/2013 |

(Continued)

OTHER PUBLICATIONS

US 8,585,996 B2, 11/2013, Nakamura et al. (withdrawn)
(Continued)

*Primary Examiner* — Wayne A Langel
(74) *Attorney, Agent, or Firm* — Holzer Patel Drennan

(57) ABSTRACT

Catalysts for $NH_3$ cracking and/or synthesis generally include barium calcium aluminum oxide compounds decorated with ruthenium, cobalt, or both. These catalysts can be bonded to a metal structure, which improves thermal conductivity and gas conductance.

11 Claims, 10 Drawing Sheets

Related U.S. Application Data on Feb. 5, 2019, provisional application No. 62/799,595, filed on Jan. 31, 2019.

(51) Int. Cl.
  B01J 37/02 (2006.01)
  C01B 3/02 (2006.01)
  C01B 3/04 (2006.01)

(52) U.S. Cl.
  CPC ....... B01J 37/0228 (2013.01); B01J 37/0244 (2013.01); C01B 3/025 (2013.01); C01B 3/047 (2013.01)

(56) References Cited

U.S. PATENT DOCUMENTS

| | | |
|---|---|---|
| 3,395,982 A | 8/1968 | Didycz |
| 3,519,546 A | 7/1970 | Lee |
| 3,721,532 A | 3/1973 | Wright et al. |
| 3,932,139 A | 1/1976 | Vilceanu et al. |
| 4,215,099 A | 7/1980 | Pinto et al. |
| 4,312,640 A | 1/1982 | Verrando |
| 4,322,394 A | 3/1982 | Mezey et al. |
| 4,537,760 A | 8/1985 | Lavie |
| 4,567,315 A | 1/1986 | Owaysi et al. |
| 5,268,091 A | 12/1993 | Boitiaux et al. |
| 5,282,886 A | 2/1994 | Kobayashi et al. |
| 5,326,537 A | 7/1994 | Cleary |
| 5,584,175 A | 12/1996 | Carlborg et al. |
| 5,711,926 A | 1/1998 | Knaebel |
| 6,471,932 B1 | 10/2002 | Gieshoff et al. |
| 6,609,570 B2 | 8/2003 | Wellington et al. |
| 6,712,950 B2 | 3/2004 | Denvir et al. |
| 6,739,394 B2 | 5/2004 | Vinegar et al. |
| 6,746,650 B1 | 6/2004 | Lesieur |
| 6,881,308 B2 | 4/2005 | Denvir et al. |
| 7,314,544 B2 | 1/2008 | Murphy et al. |
| 8,038,957 B1 | 10/2011 | Cleary |
| 8,623,313 B2 | 1/2014 | Nakamura et al. |
| 8,789,586 B2 | 7/2014 | De et al. |
| 9,108,175 B2 | 8/2015 | Schwefer et al. |
| 9,108,858 B2 | 8/2015 | McDonald et al. |
| 9,217,068 B2 | 12/2015 | D'Souza et al. |
| 9,359,867 B2 | 6/2016 | Pennewitz et al. |
| 11,286,169 B2 | 3/2022 | Beach et al. |
| 11,325,105 B2 | 5/2022 | Beach et al. |
| 2001/0018039 A1 | 8/2001 | Gam |
| 2002/0028171 A1* | 3/2002 | Goetsch ............. B01J 35/04 429/513 |
| 2003/0211026 A1 | 11/2003 | Moore |
| 2004/0039514 A1 | 2/2004 | Steichen et al. |
| 2005/0247050 A1 | 11/2005 | Kaboord et al. |
| 2006/0039847 A1 | 2/2006 | Kaboord et al. |
| 2006/0204651 A1 | 9/2006 | Wai et al. |
| 2008/0193360 A1 | 8/2008 | Holbrook et al. |
| 2012/0308467 A1 | 12/2012 | Carpenter et al. |
| 2013/0183224 A1 | 7/2013 | Hosono et al. |
| 2013/0224476 A1 | 8/2013 | Zheng et al. |
| 2014/0140911 A1 | 5/2014 | Bergeal et al. |
| 2015/0184281 A1 | 7/2015 | Ito et al. |
| 2015/0217278 A1* | 8/2015 | Hosono ............. B01J 35/006 502/328 |
| 2015/0239747 A1 | 8/2015 | Hosono et al. |
| 2015/0353369 A1 | 12/2015 | Sekine et al. |
| 2016/0271595 A1* | 9/2016 | Chen ............. B01J 31/18 |
| 2017/0087537 A1 | 3/2017 | Zhang et al. |
| 2017/0088433 A1 | 3/2017 | Kageyama et al. |
| 2017/0253492 A1 | 9/2017 | Beach et al. |
| 2020/0248606 A1 | 8/2020 | Joo et al. |

FOREIGN PATENT DOCUMENTS

| | | |
|---|---|---|
| CN | 104445967 A | 3/2015 |
| EP | 1095906 A2 | 5/2001 |
| EP | 3415805 A1 | 12/2018 |
| JP | 2008013396 A | 1/2008 |
| NO | 2015177773 A1 | 11/2015 |
| WO | 1998040311 A1 | 9/1998 |
| WO | 0247804 A1 | 6/2002 |
| WO | 2002047804 A1 | 6/2002 |
| WO | 2006099716 A1 | 9/2006 |
| WO | 2018213305 A1 | 11/2018 |
| WO | 2019104204 A1 | 5/2019 |
| WO | 2021168226 A1 | 8/2021 |

OTHER PUBLICATIONS

Kim, Sung-Wng, et al., "Fabrication of room temperature-stable 12CaO—7Al2O3 electride: a review", Journal of Materials Science: Materials in Electronics, vol. 18, 2007, 5-14.

Search Report dated Apr. 28, 2023 in International Patent Application No. PCT/US2023/060785.

Search Report dated May 10, 2023 for International Patent Application No. PCT/US2023/063502.

Fertout, Radia Imane, et al., ""Nickel Supported on Alkaline Earth Metal-Doped y-Al2O3—La2O3 as Catalysts for Dry Reforming of Methane"", Russian Journal of Applied Chemistry, 2020, vol. 93, No. 2, Abstract; Catalysts preparation, Feb. 2020, 289-298.

Jeong, Soyeon, et al., ""Sulfation and Desulfation Behavior of Pt-BaO/MgO—Al2O3 NOx Storage Reduction Catalyst"", Journal of nanoscience and nanotechnology, vol. 16, No. 5 (2016) 2.1 Catalyst Preparation, May 16, 2016, 4411-4416.

Li, Shuo, et al., ""Study on Catalytic Synthesis of Low Molecular Weight Polyether Polyol by Composite Alkaline Earth Metal"", IOP Conf. Series: Earth and Environmental Science 453 (2020) 012083 vol. 16, No. 5 (2016) 2.2. Preparation of Catalysts, 2020, 4411-4416.

International Preliminary Report on Patentability for International (PCT) Patent Application No. PCT/US17/20201, dated Sep. 13, 2018, 10 pages.

International Preliminary Report on Patentability for International (PCT) Patent Application No. PCT/US18/32759, dated Aug. 1, 2018, 15 pages.

International Search Report and Written Opinion for International (PCT) Patent Application No. PCT/US17/20201, dated May 11, 2017, 10 pages.

International Search Report and Written Opinion for International (PCT) Patent Application No. PCT/US18/34637, dated Aug. 27, 2018, 9 pages.

"Comparative Quantitative Risk Analysis of Motor Gasoline, LPG, and Anhydrous Ammonia as an Automotive Fuel", Quest Consultants, Inc. Iowa State University, 59 pages., 2009.

"KAAPtm Ammonia Synthesis Converter", https://web.archive.org/web/20110151802211/http://www.kbr.com/Technologies/Proprietary-Equipment/KAAP-Ammonia-Synthesis-Converter/, 2011.

"Targets for Onboard Hydrogen Storage Systems for Light-Duty Vehicles", U.S. Department of Energy Office of Energy Efficiency and Renewable Energy and the Freedom CAR and Fuel Partnership, 22 pages, Sep. 2009.

"Tracking Industrial Energy Efficiency and CO2 Emissions", International Energy Agency, 2007, 82-85.

Denholm, et al., "Grid Flexibility and storage required to achieve very high penetration of variable renewable electricity", Energy Policy, vol. 39(3), 2011, 1817-1830.

Frigo, et al., "Further Evolution of an Ammonia Fuelled Range Extender for Hybrid Vehicles", NH3 Fuel Conference, 23 pages, Sep. 21-21, 2014.

Giamello, "Heterogeneous Catalysis: Teaching an old material new tricks", Nature Chemistry, vol. 4(11), 2012, 869-870.

Haputhanthri, "Ammonia as an alternative transport fuel: Emulsifiers for gasoline ammonia fuel blends and real time engine performance", NH3 Fuel Conference, 24 pages, Sep. 22, 2014.

Inoue, et al., "Highly Dispered Ru on Electride [Ca24Al28O64]4+ (e-)4 as a Catalyst for Ammonia Synthesis", ACS Catalysis, vol. 42(2), Abstract Only, 2014, 676.

(56) References Cited

OTHER PUBLICATIONS

Kaiser, "10 Billion Plus: Why World Population Projections Were Too Low", http://www.sciencemag.org/news/2011/05/10-billion-plus-why-world-population-projection-were-too-low, 2011.

Kitano, et al., "Ammonia Synthesis using a stable electride as an electron donor and reversible hydrogen store", Nature Chemistry, vol. 4, Abstract Only, 2012, 934-940.

Marnellos, et al., "Synthesis of ammonia at atmospheric pressure with the use of solid state proton conductors", Journal of Catalysis, vol. 193(1), Abstract Only, 2000, 80-87.

Matsuishi, et al., "High-density electron anions in a nanoporous single crystal: $[Ca_{21} Al_{28} O_{64}]^{4+}(4e^-)$", Science, vol. 301(5633), 2003, 626-629.

Singh, et al., "KRES-ESTM Revamp Makes More Ammonia from Less Natural Gas by Energy Substitution", Session 4, Nitrogen & Syngas Conference, Feb. 21-24, Abstract Only, 2011.

Yiokari, et al., "High-pressure electrochemical promotion of ammonia sysnthesis over an industrial iron catalyst", Journal of Physical Chemistry A, vol. 104(46), Abstract Only, 2000, 10600-100602.

\* cited by examiner

METAL-DECORATED BARIUM CALCIUM ALUMINUM OXIDE CATALYST FOR NH3 SYNTHESIS AND CRACKING AND METHODS OF FORMING THE SAME

CROSS-REFERENCE TO RELATED APPLICATION(S)

This application claims priority and the benefit under 35 U.S.C. § 119(e) to U.S. Provisional Patent Application Ser. Nos. 62/799,595 ("Metal-Decorated Barium Calcium Aluminum Oxide Catalyst for Cracking NH₃"), filed on 31 Jan. 2019; 62/801,578 ("Metal Monolith Supported Catalysts for NH₃ Synthesis and Cracking"), filed on 5 Feb. 2019; and 62/931,537 ("Cobalt-Decorated Barium Calcium Aluminum Oxide for NH₃ Synthesis and Cracking"), filed on 6 Nov. 2019, each of which is incorporated herein in its entirety by reference.

This application is related to International Publication No. WO 2018/213305, entitled "Metal-Decorated Barium Calcium Aluminum Oxide and Related Materials for NH₃ Catalysis" which was filed on 15 May 2018. It is hereby incorporated by reference in its entirety.

STATEMENT REGARDING FEDERALLY SPONSORED RESEARCH OR DEVELOPMENT

This invention was made with government support under grant number DE-AR0000685 awarded by the Department of Energy. The Government has certain rights in the invention.

TECHNICAL FIELD

This present disclosure relates to catalysts for both (1) cracking ammonia into a mixture of nitrogen, hydrogen, and ammonia and (2) synthesizing ammonia from a mixture of nitrogen and hydrogen. Methods of fabricating the catalysts and cracking and/or synthesizing NH₃ using the catalyst are also described herein.

BACKGROUND

Human-caused emissions of carbon dioxide (CO₂) are causing global warming, climate changes, and ocean acidification, each of which threaten humanity's continued economic development and security. To counter this threat, energy sources that are substantially free of CO₂ emissions are highly sought after in both industrialized and developing countries. While several CO₂-free energy generation options have been extensively developed, none presently include a practicable CO₂-free fuel.

Ammonia (NH₃) can be burned as a fuel according to the following reaction equation (1):

$$4NH_3(g) + 3O_2 \rightarrow 2N_2 + 6H_2O(g) + \text{heat} \tag{1}$$

NH₃ can be used directly as a carbon-free fuel or as a hydrogen source if it is thermally reformed into hydrogen and nitrogen gases. It can also be used in a mixture of NH₃, H₂, and N₂ to tailor its combustion characteristics to specific processes or equipment. It has a higher energy density, easier storage conditions, and cheaper long-term storage and distribution than gaseous hydrogen, liquid hydrogen, or batteries.

The main industrial procedure for the production of ammonia is the Haber-Bosch process, illustrated in the following reaction equation (2):

$$N_2(g) + 3H_2(g) \rightarrow 2NH_3(g)(\Delta H = -92.2 \text{ kJ/mol}) \tag{2}$$

In 2005, Haber-Bosch ammonia synthesis produced an average of about 2.1 tonnes of CO₂, per tonne of NH₃ produced; about two thirds of the CO₂ production derives from the steam reforming of hydrocarbons to produce hydrogen gas, while the remaining third derives from hydrocarbon fuel combustion to provide energy to the synthesis plant. As of 2005, about 75% of Haber-Bosch NH₃ plants used natural gas as feed and fuel, while the remainder used coal or petroleum. Haber-Bosch NH₃ synthesis consumed about 3% to 5% of global natural gas production and about 1% to 2% of global energy production.

The Haber-Bosch reaction is generally carried out in a reactor containing an iron oxide or a ruthenium catalyst at a temperature of between about 300° C. and about 550° C. and at a pressure of between about 90 bar and about 180 bar. The elevated temperature is required to achieve a reasonable reaction rate. Due to the exothermic nature of NH₃ synthesis, the elevated temperature drives the equilibrium toward the reactants, but this is counteracted by the high pressure.

Recent advances in ammonia synthesis have yielded reactors that can operate at temperatures between about 300° C. and about 600° C. and pressures ranging from 1 bar up to the practical limits of pressure vessel and compressor design. When designed for lower operating pressures, this newer generation of reactors can reduce equipment costs and gas compression costs, but they also reduce the fraction of the N₂ and H₂ reactants converted to NH₃ during each pass through the catalyst bed. This increases the number of re-circulations required to make a given quantity of NH₃, which can increase the heat loss for a given quantity of NH₃ unless the reactor heat is recycled efficiently with an appropriate heat exchanger. The higher number of reactant re-circulations can also increase the recirculation pump energy requirements unless a catalyst bed with high gas conductance is used.

Thermal cracking of NH₃ can require temperatures of 700-900° C. using today's commercial catalysts. Even higher temperatures are required if catalysts are not used. Such high temperatures are not desirable because they increase the energy required for cracking the NH₃ and because they can cause many materials to deform or degrade. Ruthenium on an alumina support is known to catalyze NH₃ cracking, but it requires relatively high metal loading and relatively high (about 700° C.) operation. High ruthenium loading is not desirable because it increases catalyst cost. Ruthenium is a platinum group metal, which are relatively scarce and have a high cost per gram. A 700° C. operating temperature is also not desirable because it is still hot enough to quickly degrade or deform low-cost steels and stainless steels.

NH₃-fueled equipment that starts and stops frequently, such as automobiles and peaking power plants, require a NH₃ cracker design that can be heated to its operating temperature quickly and that can maintain good catalyst adhesion after many temperature cycles. Equipment that must fit into a constrained space requires a compact NH₃ cracker design. Equipment that requires substantial volumes of fuel or that has highly variable fuel flow requirements can benefit from a NH₃ cracker that has high gas conductance to minimize fuel pressure drop during high flow operation.

NH₃ fuel is now being used by alkaline fuel cell manufacturers. It is a leading contender for decarbonizing maritime shipping and for providing seasonal energy storage for carbon-free electricity grids. It is also the most likely solution to for decarbonizing internal combustion engines for long-distance trucking.

Recently developed $NH_3$ synthesis reactors and $NH_3$ cracking reactors for $NH_3$ fuel use expose a need in the art for $NH_3$-active catalyst beds that (a) can operate well below 700° C., (b) can be heated quickly to their operating temperature, (c) experience minimal degradation from thermal cycles, (d) require only small platinum group metal loading or no platinum group metals at all, and (e) have high gas conductance.

DETAILED DESCRIPTION

Figure 1:
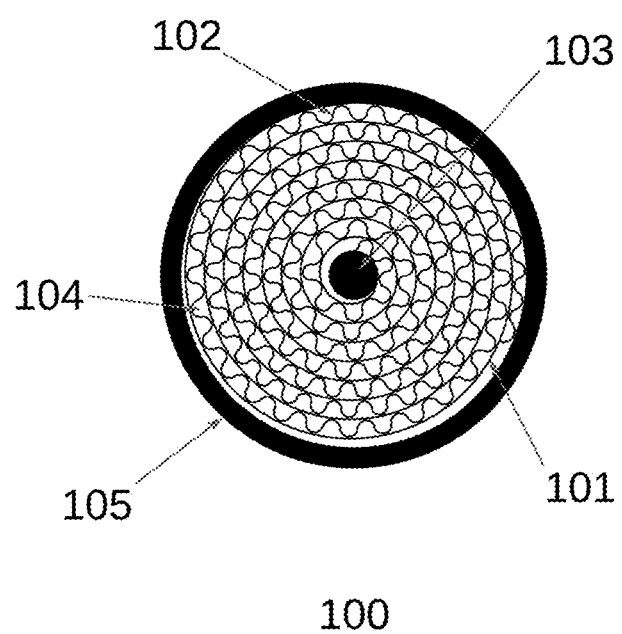
FIG. 1 illustrates a radial cross section of a corrugated metal monolith made for laboratory testing.

Described herein are various embodiments of a cobalt-decorated and a ruthenium and cobalt-decorated barium calcium aluminum oxide catalyst that is suitable for both synthesizing $NH_3$ from a $N_2+H_2$ mixture and cracking $NH_3$ into a $N_2+H_2+NH_3$ mixture, and corresponding methods of synthesizing and cracking $NH_3$ using the disclosed catalysts. Also described herein are various embodiments of a ruthenium-decorated barium calcium aluminum oxide catalyst suitable for $NH_3$ cracking and associated methods of cracking $NH_3$ using the disclosed catalyst. Thus, as described herein, the disclosed catalysts can use either a low ruthenium loading, a cobalt loading (no ruthenium at all), or a mixture of ruthenium and cobalt. The catalyst described herein can be bonded to a metal structure, which improves thermal conductivity and gas conductance. The technology described herein improves upon the state of the art at least by (a) providing a highly $NH_3$-active catalyst with low or no platinum group metal loading, (b) reducing the temperature required for cracking $NH_3$, and/or (c) providing a catalyst that can be robustly bonded to precisely designed metal monoliths that reduce the catalyst bed thermal mass, increase its thermal conductivity, and increase its gas conductance.

The present disclosure references "B2CA," which is a cement chemistry notation in which B=BaO (barium oxide), C=CaO (calcium oxide), and A=$Al_2O_3$ (aluminum oxide). Thus, as used herein, the term "B2CA"=$Ba_2CaAl_2O_6$, a barium calcium aluminum oxide compound. Using similar cement chemistry notation, the present disclosure also references additional barium calcium aluminum oxide compounds, such as B21C16A3 ($Ba_{21}Ca_{16}Al_6O_{46}$), BCA2 ($BaCaAl_2O_6$), B5C7A4, ($Ba_5Ca_7Al_8O_{24}$), B3C3A2 ($Ba_3Ca_3Al_2O_{12}$), B2C5A ($Ba_2Ca_5Al_2O_{10}$), and BCA ($BaCaAl_2O_5$).

Catalyst Synthesis

The catalysts described herein, and which are generally suitable for use in the $NH_3$ cracking and synthesis methods described herein, are prepared by first synthesizing a B2CA powder or related barium calcium aluminum oxide composition. Any method of synthesizing the B2CA or related barium calcium aluminum oxide composition can be used. The barium calcium aluminum oxide compound used in preparing the catalyst described herein can also have some or all of the aluminum oxide replaced with boron oxide. In some embodiments, the method of preparation of the barium calcium aluminum oxide compound, including preparation of the barium calcium aluminum oxide compound having some or all of the aluminum oxide replaced with boron oxide, is similar or identical to the methods described in International Publication No. WO 2018/213305, the entirety of which is hereby incorporated by reference.

The resulting powder is then decorated with either 0.1 wt % to 10 wt % ruthenium, 0.1 to 50 wt % cobalt, or a combination of ruthenium and cobalt within these previously stated ranges. Decoration of the barium calcium aluminum oxide powder with a catalytically active metal can be carried out using any suitable methodology, including but not limited to in a manner similar or identical to the methods described in WO 2018/213305. When following the methods described in WO 2018/213305, decoration is generally carried out by (a) stirring the powder in a metal salt+acetone solution to decorate its surface with a salt of the desired metal, and (b) annealing the resulting material in hydrogen-containing atmosphere to reduce the metal salt to a metal. Non-limiting examples of suitable metal salts are $RuCl_3$ hydrate for Ru decoration and $CoCl_2$ hexahydrate for Co decoration. A Ru+Co metal decoration mixture can be produced by either using a solution that contains both Ru and Co salts or by depositing the metals in succession. The water present in the hydrated salts does not appear to damage the barium calcium aluminum powder by hydrating it. $RuCl_3$ hydrate is typically cheaper to purchase and dissolves more easily in acetone than anhydrous $RuCl_3$, and therefore may be preferable in some embodiments.

In some embodiments, step (b) can be omitted, such as when it is desired to reduce the metal salt to a metal in a $NH_3$ synthesis or cracking apparatus the first time it is heated to operating temperature under a $H_2$ or $NH_3$ flow. However, if this is done, care must be taken that the evolved anion of the salt (chlorine, for example) does not damage downstream equipment in the synthesis or cracking apparatus.

A Co/barium calcium aluminum oxide catalyst can be converted to a Co-oxide/barium calcium aluminum oxide catalyst by annealing the Co/barium calcium aluminum oxide in an oxygen-containing atmosphere. For some cobalt loadings, the oxidized version of the catalyst performs better than the metal version for $NH_3$ synthesis. An example of annealing the Co/barium calcium aluminum oxide to form Co-oxide/barium calcium aluminum oxide is annealing the Co/barium calcium aluminum oxide in a 50% oxygen/50% nitrogen atmosphere using a 5° C./minute ramp to 400° C., 2 h dwell at 400° C., and then a 5° C./minute ramp to room temperature.

Thus formed, the metal-decorated barium calcium aluminum oxide composition can be formed into a catalyst bed by any of the methods described in International Publication No. WO 2018/213305, or via any other suitable method. The methods described in WO 2018/213305 include, as examples, using the material as a powder, extruding it into pellets, pressing it into pellets, and bonding it to structural supports. It has been found that metal monoliths with a thin layer of metal-decorated barium calcium aluminum oxide bonded to their surface are particularly beneficial for $NH_3$ synthesis and cracking due to their high gas conductance, high thermal conductivity, and high catalyst utilization.

Metal-Decorated Barium Calcium Aluminum Oxide Catalyst-Coated Metal Monolith Fabrication Methods of fabricating a metal-decorated barium calcium aluminum oxide catalyst-coated metal monolith generally include three steps: fabricating the monolith, coating the monolith with a barium calcium aluminum oxide compound, and decorating the barium calcium aluminum oxide coating with the catalytically active metal.

The metal monolith can be formed in whatever specific shape is required by engineering requirements such as gas conductance, thermal conductivity, and surface area per unit length of monolith. Metal monoliths are available from commercial vendors in a variety of configurations. FIG. 1 illustrates the radial cross section of a spiral metal monolith 100 that was fabricated by Starfire Energy for laboratory testing purposes. In this case, the metal monolith 100 is formed from two pieces of sheet metal that lay against each other in a spiral. One piece of sheet metal 101 is flat, while the other 102 is corrugated. One end of the sheet metal pieces 101 and 102 are welded to a rod 103. The sheet metal pieces 101 and 102 are wrapped around the rod 103, which produces axial channels 104 through which the reactants can flow. The spiral monolith 100 is inserted into a metal tube 105, which keeps the spiral from unwinding and allows the monolith 100 to be later joined to process gas pipes for reactant gas inlet and product gas outlet. Many other metal monolith designs are possible.

Figure 2A:
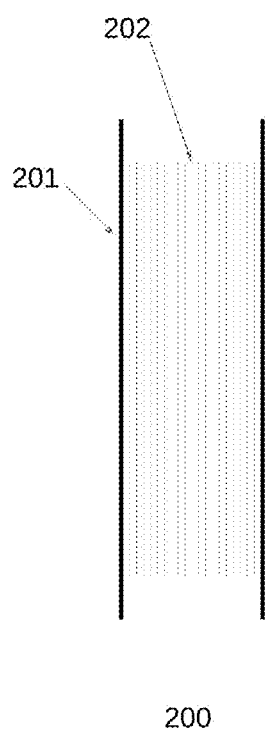
FIGS. 2A and 2B illustrate axial cross sections of a metal monolith and that type of monolith fitted with tube connections for testing in benchtop apparatus.
Figure 2B:
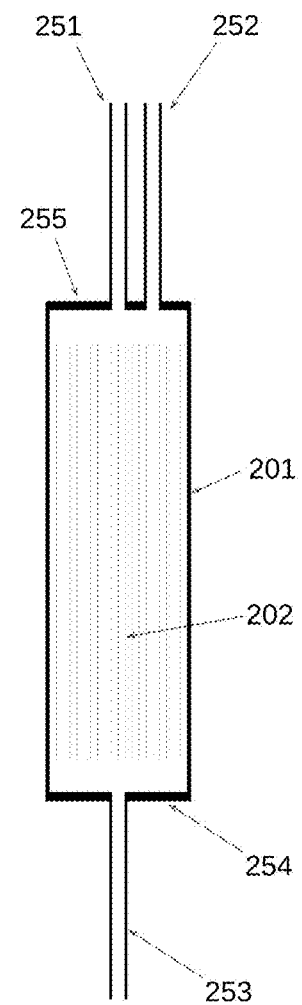

FIG. 2A illustrates an axial cross section of a monolith 200 and FIG. 2B illustrates a monolith 250 after monolith 200 has been fit with end caps and tubing connections for testing in a benchtop catalyst testing apparatus. In this embodiment, the monolith 200 includes a metal tubing shell 201 and a corrugated metal foil interior 202. The monolith 200 that has been prepared for testing 250 includes the same metal tubing shell 201 and foil interior 202, to which have been welded end caps 254 and 255. Tubes 251, 252, and 253 are welded to the endcaps. Tube 252 provides reactants to the catalyst monolith and tube 253 accepts product gases from the catalyst monolith. Tube 251 allows a thermocouple to be placed near or on the reactant inlet side of the monolith to measure its temperature.

The monolith sheet metal can be selected based on its temperature tolerance, chemical compatibility, and/or catalyst adhesion characteristics, as well as any other characteristics. In the case of $NH_3$ cracking, the sheet metal is preferably tolerant of reducing atmospheres ($H_2$ and $NH_3$ in particular) at temperatures up to at least 450° C., and preferably up to 700° C. It is also desirable that barium calcium aluminum oxide compound adhere well to the monolith sheet metal. Fecralloy (the trade name of an aluminum-containing stainless steel), aluminized stainless steel (stainless steel dip-coated with aluminum in a process similar to galvanization), and stainless steel alloys can satisfy these conditions and are commercially available. Aluminized mild steel alloys may be suitable.

The metal monolith can be oxidized to promote barium calcium aluminum oxide adhesion. In the case of Fecralloy or aluminized stainless steel monoliths, the oxidation causes a well-bonded layer of aluminum oxide to form on the sheet metal surface. This aluminum oxide layer can promote barium calcium aluminum oxide adhesion. Surface oxidation can also promote barium calcium aluminum oxide adhesion to stainless steel. An example of an annealing profile to oxidize Fecralloy is a 6 hour anneal at 1015° C. in a 50% $O_2$+50% $N_2$ atmosphere. An example of an annealing profile to oxidize aluminized stainless steel is a 6 hour anneal at 700° C. in a 50% $O_2$+50% $N_2$ atmosphere.

In some embodiments, the metal monolith can be designed and fabricated to allow a current to be passed through it so it can be electrically heated. An example of such a monolith is the EmiCat metal monolith produced by Continental Corporation.

Barium calcium aluminum oxide powder is deposited on the metal monolith from an organic solvent slurry containing an organic binder. The organic solvent preferably has low viscosity to facilitate slurry flow through the monolith and a high vapor pressure to facilitate rapid evaporation of solvent from the slurry-coated monolith. An example of a suitable organic solvent is acetone. An example of a suitable organic binder is citric acid. It has been found that 10 mg of citric acid per mL of acetone provides good binding properties for tested monoliths; however, the specific citric acid concentration can be adjusted to tailor the slurry properties to the specific application. Water is preferably not used as a substantial component of the solvent for the barium calcium aluminum oxide slurry because barium calcium aluminum oxide is a cement-former that will hydrate when exposed to water. This hydration can change its physical and chemical properties.

Barium calcium aluminum oxide slurry can be formed by adding finely ground barium calcium aluminum oxide compound to the organic solvent+binder solution. An example of "finely ground" is powder that has been planetary ball milled to around 4 $m^2/g$ surface area as measured by nitrogen BET analysis. Powders with substantially lower surface area may not stay suspended in the organic solvent+binder solution to form a slurry. Barium calcium aluminum oxide powders with higher surface area can work well, but are not strictly necessary.

The barium calcium aluminum oxide can be applied to the monolith by dipping the monolith in the slurry, by pouring the slurry through the monolith, or by pumping the slurry through the monolith, as well as by any other suitable means. In all cases, after enough slurry has drained from the monolith to allow the channels to open, the monolith can be rotated from "right-side up" to "up-side down" to encourage a uniform slurry coating. Rotation can be continued until enough solvent has evaporated from the slurry that it no longer flows on the monolith surfaces.

The dried slurry-coated monolith can be annealed in an oxygen atmosphere to evaporate residual solvent, burn away the organic binder, and promote bonding of the barium calcium aluminum oxide grains to each other and to the monolith. Examples of an oxygen atmosphere include 50% oxygen in nitrogen and ambient air. An example of an annealing profile for bonding the barium calcium aluminum oxide to the metal monolith is a 5° C./minute ramp to 700° C., a 6 hour dwell at 700° C., and a 5° C./minute ramp to room temperature. Other annealing profiles can be used, and may be selected based on the monolith temperature tolerances and trade-offs between final barium calcium aluminum oxide surface area and bonding strength. The annealing temperature preferably does not exceed 1200° C. because that will melt the barium calcium aluminum oxide and, as a result, likely damage the metal monolith.

The barium calcium aluminum oxide coating on the monolith can be decorated with Ru or Co or both by either immersing the monolith in an appropriate metal salt solution or pouring an appropriate metal salt solution through its channels. An example of a Co solution is cobalt chloride hexahydrate dissolved in acetone. Cobalt loadings of 0.1 to 50 wt % (referenced to the mass of barium calcium aluminum oxide on the monolith) can be used, with 15 to 25 wt % Co being one preferred range. An example of a Ru solution is $RuCl_3$ hydrate dissolved in acetone. Ru loadings of 0.1 to 10 wt % (referenced to the mass of barium calcium aluminum oxide on the monolith) can be used, with 1 to 5 wt % Ru being one preferred range. In both cases, the metal salt adsorbs onto the barium calcium aluminum oxide from the solution, causing the solution color to lighten. The desired metal loading can be achieved by either using a small amount of concentrated solution or a larger amount of dilute solution. For narrow channeled monoliths, the acetone solution may be held in the channel by capillary action, causing it to have a very long evaporation time. In this case, metal salt deposition can also be fostered by blowing the metal salt solution out of the monolith channels and into a container with compressed gas, continuing to flow the compressed gas to evaporate the residual solvent from the channels, and then pouring the captured solution back through the monolith. This process can be repeated until the solution is consumed. The metal chloride decoration can be converted to metal by annealing. In some embodiments, annealing in a hydrogen atmosphere is preferable because hydrogen encourages the chlorine to leave the metal chloride to become HCl gas, allowing the anneal to occur at a lower temperature (as low as 200° C.). The anneal can also occur in nitrogen, but a higher temperature is required (for example, 500° C.). An example of an anneal in a hydrogen atmosphere to convert the metal chloride to metal is a 5° C./minute ramp to 400° C., 2 h dwell at 400° C., and then a 5° C./minute ramp to room temperature. Another example is annealing in a hydrogen atmosphere for 12 hours at 240° C.

Catalyst Use for $NH_3$ Cracking

In exemplary catalyst cracking methods, the cracking catalyst bed or monolith is heated to 300 to 650° C. and $NH_3$ gas is directed through it. The $NH_3$ input stream can be preheated before it is directed into the catalyst bed. $NH_3$ cracking is an endothermic process, so the cracking bed requires heating to maintain its temperature during use.

When the $NH_3$ gas flows through the hot catalyst bed, it cracks into a $N_2+H_2+NH_3$ mixture. The $N_2$ and $H_2$ will be in the stoichiometric 3 $H_2$:1 $N_2$ ratio dictated by the composition of the $NH_3$ reactant. The concentration of residual $NH_3$ in the cracked product gas can vary depending on (a) whether the reaction proceeded to equilibrium in the cracker, and (b) the thermodynamic equilibrium concentration of $NH_3$ in a $N_2+H_2+NH_3$ mixture for the temperature and pressure used in the cracker.

The equilibrium concentration of $NH_3$ in the product stream can be reduced by increasing the catalyst bed temperature or reducing its pressure. The equilibrium concentration of $NH_3$ in the product stream can be increased by reducing the catalyst bed temperature or increasing its pressure.

For a given catalyst bed volume, temperature, and pressure, the fraction of the incoming $NH_3$ that is cracked to $N_2+H_2$ can be brought closer to the thermodynamic equilibrium value by increasing the residence time in the catalyst bed by reducing the $NH_3$ flow rate. If only partial cracking of the $NH_3$ gas is desired, the fraction of the $NH_3$ that is cracked in the reactor can be reduced by decreasing the residence time in the catalyst bed by increasing the $NH_3$ flow. For a constant $NH_3$ input flow, pressure, and catalyst bed volume, the cracked $NH_3$ fraction can be increased by increasing the bed temperature and decreased by decreasing the bed temperature.

Catalyst Use for $NH_3$ Synthesis

In exemplary catalyst synthesis methods, the synthesis catalyst bed or monolith is heated to 200 to 650° C. and a $N_2+H_2$ gas mixture is directed through it. The reactant pressure can range from 0.1 bar to 500 bar. The reactant input stream can be preheated before it is directed into the catalyst bed. When the $N_2+H_2$ gas mixture flows through the hot catalyst bed, a portion of it is converted to $NH_3$. The concentration of $NH_3$ in the product gas can vary depending on (a) whether the reaction proceeded to equilibrium in the reactor, and (b) the thermodynamic equilibrium concentration of $NH_3$ in a $N_2+H_2+NH_3$ mixture for the temperature and pressure used in the reactor.

The equilibrium concentration of $NH_3$ in the product stream can be increased by reducing the catalyst bed temperature or increasing its pressure. $NH_3$ synthesis is an exothermic process, so the cracking bed can become hotter as $NH_3$ is synthesized. This can be particularly important at high operating pressures, for which heat removal mechanisms may be required to keep the reactor from overheating.

For a given catalyst bed volume, temperature, and pressure, the fraction of the incoming $N_2+H_2$ that is converted to $NH_3$ can be brought closer to the thermodynamic equilibrium value by increasing the residence time in the catalyst bed by reducing the $NH_3$ flow rate.

EXAMPLES

Example 1

A B2CA powder was prepared and decorated with 1 wt % Ru metal according to the methods described in International Publication No. WO 2018/213305. The Ru-decorated powder was cold-pressed into pellets with no binder. The pellets were crushed to produce a range of granule sizes and the resulting mixture was sieved to select the approximately 20 mesh granules. 0.2 g of Ru-decorated B2CA granules were mixed with 0.4 g catalyst-free alumina granule diluent and the catalyst-diluent mixture was loaded into a catalyst holder.

The cracking capability of the catalyst-diluent mixture was tested in a laboratory apparatus that included a $NH_3$ gas supply, $NH_3$ flow controller, tube furnace, $NH_3$ preheating tube, catalyst holder, and a gas chromatograph. The $NH_3$ preheating tube and the catalyst holder were both located in the tube furnace. $NH_3$ gas passed sequentially through the $NH_3$ flow controller, preheating tube, and catalyst holder. The product gas passed through tubing to allow it to cool to room temperature and was then sampled by the gas chromatograph to determine its composition.

Figure 3:
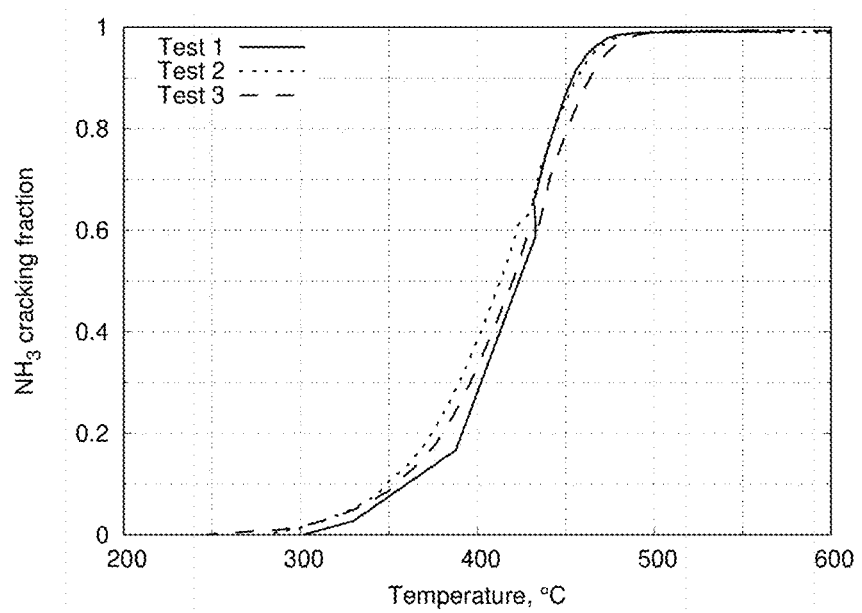
FIG. 3 illustrates $NH_3$ cracking fraction as a function of catalyst temperature for a 1 wt % Ru/B2CA packed catalyst bed.

FIG. 3 shows $NH_3$ cracking data from three tests using a 10 standard mL/minute $NH_3$ flow at ambient pressure (approximately 1700 m above sea level) for furnace temperatures up to 600° C. The data shown in FIG. 3 was collected as the catalyst cooled from 600° C. to 200° C. The small offset in each data curve around 0.6 cracking fraction is due to the gas chromatograph changing calibration curves at that point. In all three tests, it can be seen that the $NH_3$ is fully cracked at 475° C. and higher temperatures. The cracking fraction decreases for temperatures below 475° C. and approaches zero at 250° C. and below.

Example 2

Figure 4:
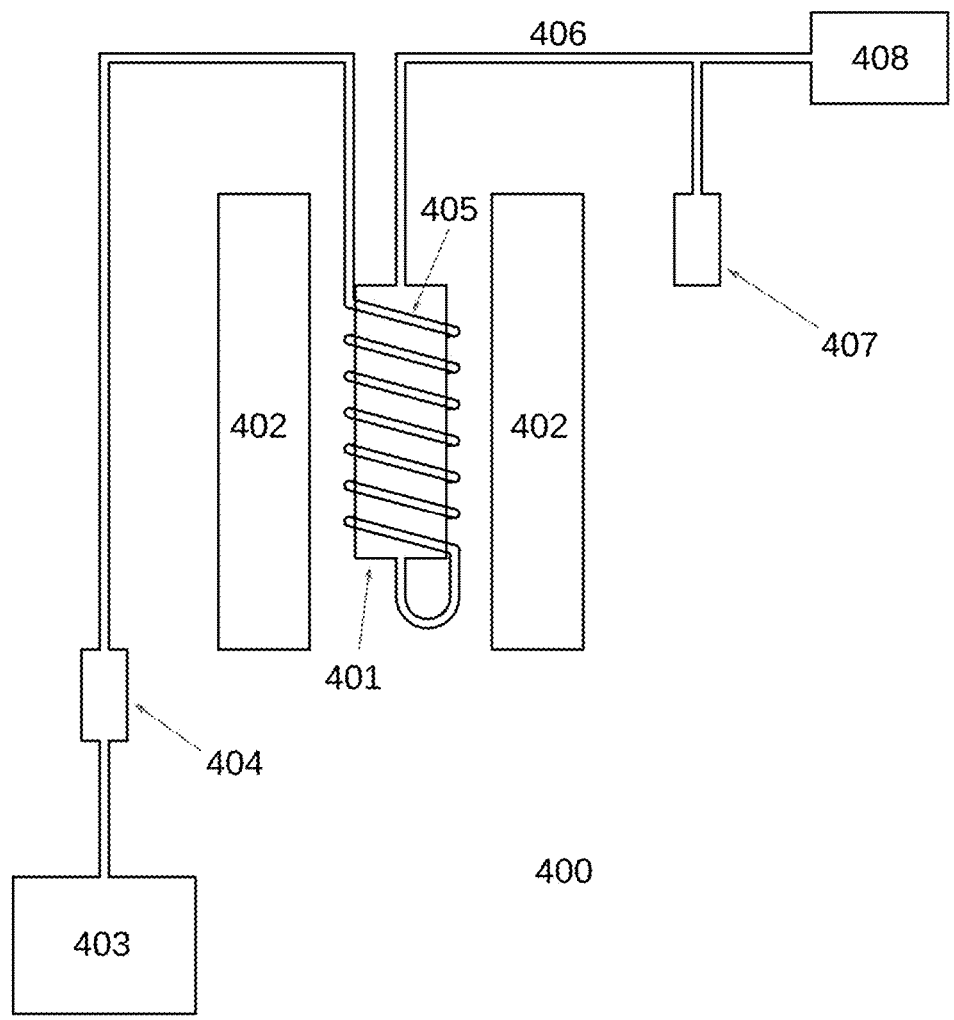
FIG. 4 illustrates the benchtop $NH_3$ cracking apparatus used for testing catalyst.

Metal monoliths were coated with 10, 15, and 20 wt % Co/B2CA as described above. The monoliths were fitted with tubing connections as shown in FIG. 2. The $NH_3$-cracking capability of each monolith was tested by placing it in a benchtop ammonia cracking apparatus 400, which is depicted in FIG. 4. The catalyst-coated monolith 401 is heated by a cylindrical heater 402. Ammonia gas from a storage vessel 403 passes through a flow controller 404 and a preheating tube 405 to enter the catalyst monolith 401. After passing through the monolith 401, the product gas continues through tubing 406 to be analyzed by a thermal conductivity meter 407 and then burned in a flare 408.

Figure 5:
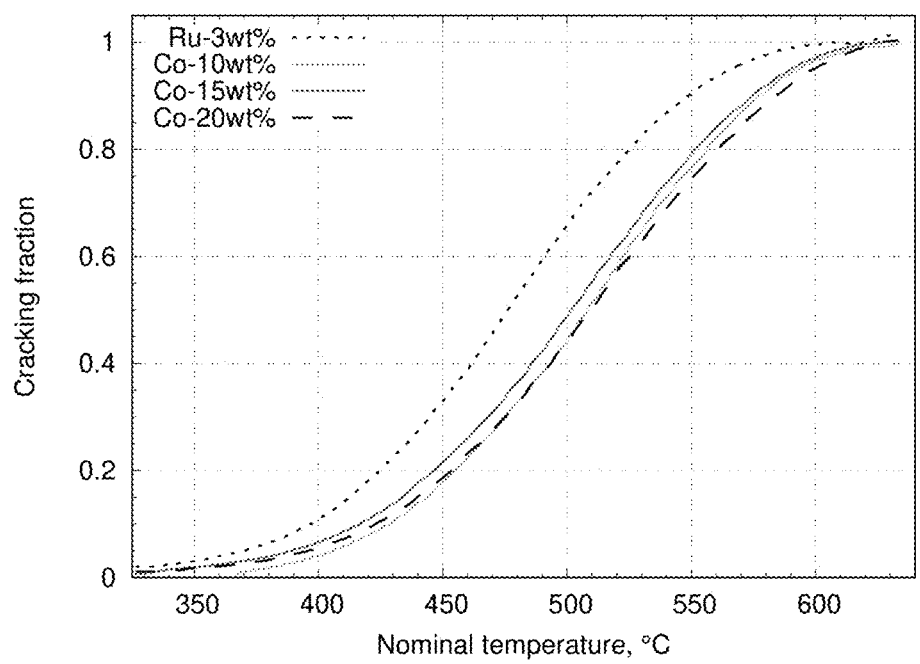
FIG. 5 illustrates the $NH_3$ cracking performance of Ru/B2CA and Co/B2CA as a function of temperature.

The catalyst monolith was heated to temperatures ranging from 300 to 650° C. while a 1 standard liter per minute (sLm) flow of ambient pressure $NH_3$ was provided to it. For these monoliths, that flow equates to a 300 $hr^{-1}$ GHSV and a $NH_3$ residence time of 12 seconds. The hydrogen content of the gas exiting the catalyst monolith was measured with the thermal conductivity device. FIG. 5 shows the cracking fraction (0=no $NH_3$ cracked, 1=nominally all $NH_3$ cracked to $N_2+H_2$) for the Co/B2CA coated monoliths (light gray, dark gray, and dashed curves) along with a 3 wt % Ru/B2CA coated monolith (dotted curve) for comparison. It shows that the 10 wt %, 15 wt %, and 20 wt % Co/B2CA monoliths had similar performance, with the 15 wt % monolith having a slightly higher cracking fraction at a given temperature than the 10 wt % and 20 wt % monoliths. The Co/B2CA monoliths had to be heated to about 30° C. higher temperature to achieve the same cracking fraction as the 3 wt % Ru/B2CA monolith.

Example 3

A metal monolith was coated with 20 wt % Co/B2CA as described above. The monolith was fit with tubing connections as shown in FIG. 2 and placed in the benchtop $NH_3$ cracking test apparatus depicted in FIG. 4. The monolith was heated to a nominal 650° C. and ambient pressure $NH_3$ was flowed through it at rates ranging from 0.5 to 14 standard liters per minute (sLm).

Figure 6:
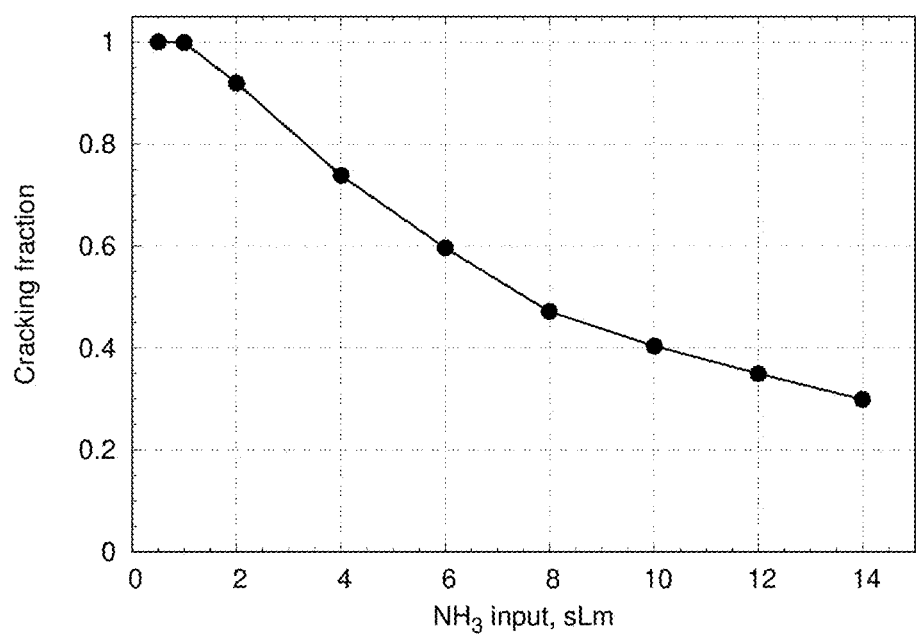
FIG. 6 illustrates the $NH_3$ cracking performance of 20 wt % Co/B2CA as a function of $NH_3$ flow.

The cracking fraction as a function of flow is shown in FIG. 6. Full cracking was achieved at 0.5 sLm and 1.0 sLm $NH_3$ reactant flows. For $NH_3$ reactant flows greater than or equal to 2 sLm, the cracking fraction was reduced. It was observed that the product gas flare flame became unstable at 14 sLm $NH_3$ flow, which had a cracking fraction about 0.3 At that flow, the space velocity for the tested monolith is 4200 $hr^{-1}$ and the $NH_3$ residence time is 0.8 s.

Example 4

Figure 7:
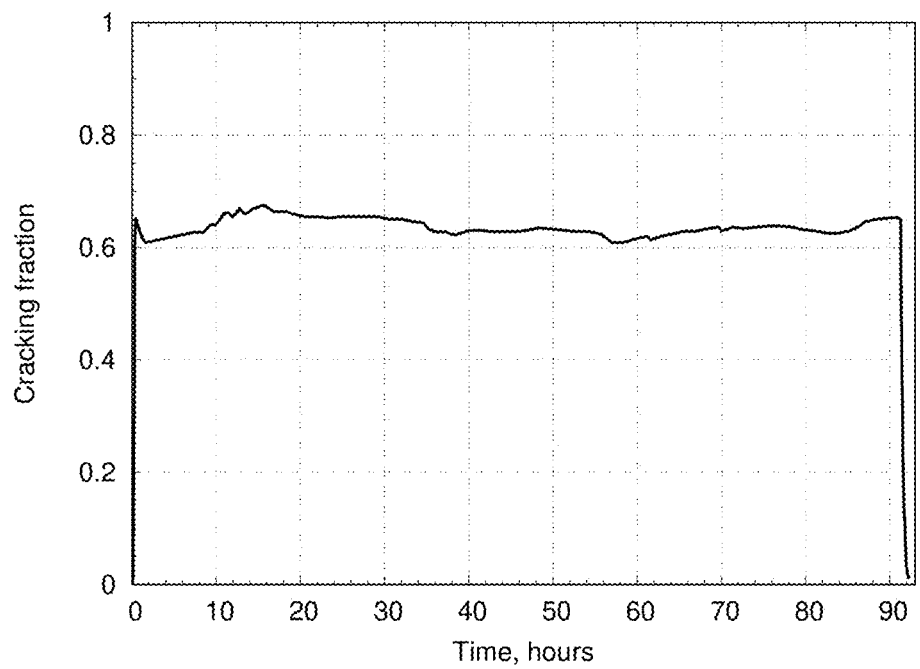
FIG. 7 illustrates the $NH_3$ cracking performance of 20 wt % Co/B2CA as a function of time.

The 20 wt % Co/B2CA monolith used in Example 2 was placed in the benchtop $NH_3$ cracking test apparatus depicted in FIG. 4. The monolith was heated to a nominal 550° C. and ambient pressure $NH_3$ was supplied to it at 1 standard liter per minute (sLm) for a period of 90 hours. The cracking fraction as a function of time is shown in FIG. 7. Over the course of the 90 hours, the cracking fraction had no significant change, indicating that the Co/B2CA catalyst was stable during this period.

Figure 8:
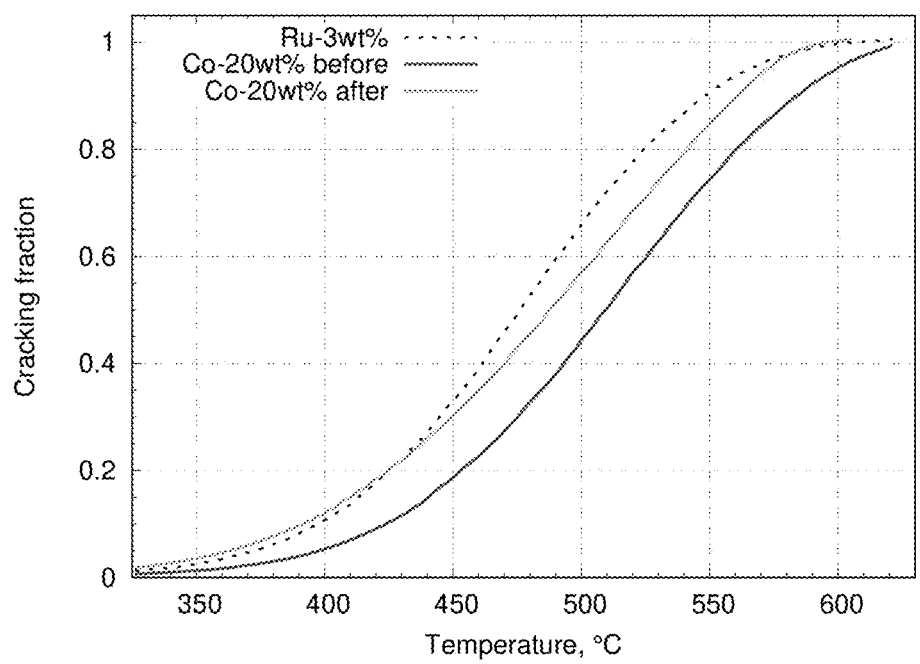
FIG. 8 compares the $NH_3$ cracking performance of 20 wt % Co/B2CA before and after durability testing with that of Ru/B2CA.

After the 90 hour test was completed, the monolith's cracking fraction as a function of temperature was measured at 1 sLm $NH_3$ flow. FIG. 8 shows $NH_3$ cracking as a function of temperature for the 20 wt % Co/B2CA monolith before the durability test (black solid curve), the 20 wt % Co/B2CA monolith after the durability test (gray solid curve), and a 3 wt % Ru/B2CA monolith (black dotted curve) that has not been subjected to a durability test. The 20 wt % Co/B2CA cracking performance improved after the 90 hour durability test, and became nearly the same as the 3 wt % Ru/B2CA performance.

Example 5

Co/B2CA and Co-oxide/B2CA powders were prepared with 1 wt %, 5 wt %, 10 wt %, 15 wt %, and 20 wt % cobalt loadings using the methods described above. In this case, the cobalt salt was deposited on the B2CA powder by making a solution of cobalt chloride hexahydrate in acetone with the desired amount of cobalt, mixing B2CA powder into it, and then repeatedly stirring the mixture until the acetone had evaporated. As the acetone evaporated, the mixtures changed from blue to pink, indicating that the cobalt chloride salt ions had re-bonded.

The cobalt salt decorated B2CA powders were reduced to cobalt metal by annealing them in 50% $H_2$+50% $N_2$ gas flow for four hours at 700° C. After annealing the samples had all changed color to shades of black, indicating that the salt had reduced to cobalt metal. The Co/B2CA samples' $NH_3$ synthesis characteristics were measured in a benchtop differential $NH_3$ synthesis reactor. After that testing, the samples were oxidized by annealing in a tube furnace under a 50% $N_2$+50% $O_2$ flow for 4 hours at 700° C. After annealing in oxygen, the sample colors were unchanged except for the 1 wt % cobalt, which had a slightly reddish hue. The oxidized samples were then retested in the benchtop $NH_3$ synthesis reactor.

Figure 9:
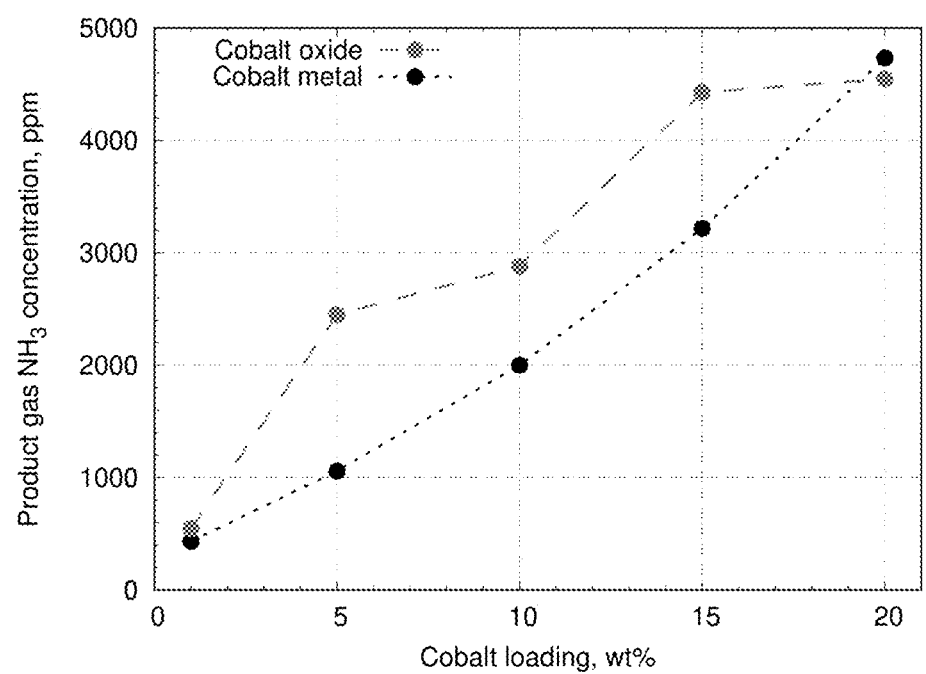
FIG. 9 compares the $NH_3$ synthesis performance of cobalt-decorated B2CA and cobalt-oxide-decorated B2CA.

For testing both the metallic cobalt and cobalt oxide decorations, one gram of catalyst powder was placed in the reactor. A 10 bar mixture of 75% $H_2$+25% $N_2$ was flowed through the powder catalyst bed at flows ranging from 2 to 20 sLm and temperatures ranging from room temperature to 625° C. FIG. 9 shows the highest concentration of ammonia produced by each catalyst powder at 4 sLm reactant flow. The cobalt oxide decorated powders produced a higher ammonia concentration at 5, 10, and 15 wt % loadings. At 1 wt % and 20 wt % loading, the cobalt metal decoration and the cobalt oxide decoration produce about the same ammonia concentration.

Example 6

The effect of the barium calcium aluminum oxide composition on ruthenium-decorated and cobalt-decorated catalyst performance for $NH_3$ synthesis was examined. Seven compositions in the BaO—CaO—$Al_2O_3$ ternary space were synthesized. The specific compositions were B21C16A3, BCA2, B5C7A4, B3C3A2, B2C5A, BCA, and B2CA. Each composition was divided into two samples that were decorated with either 20 wt % cobalt or 1 wt % ruthenium. The $NH_3$ synthesis characteristics for 1 gram of each metal-decorated sample was examined in a benchtop differential $NH_3$ synthesis reactor at temperatures up to 625° C. in a constant flow of 4 sLm of 75% $H_2$+25% $N_2$. at 10.6 bar.

Figure 10:
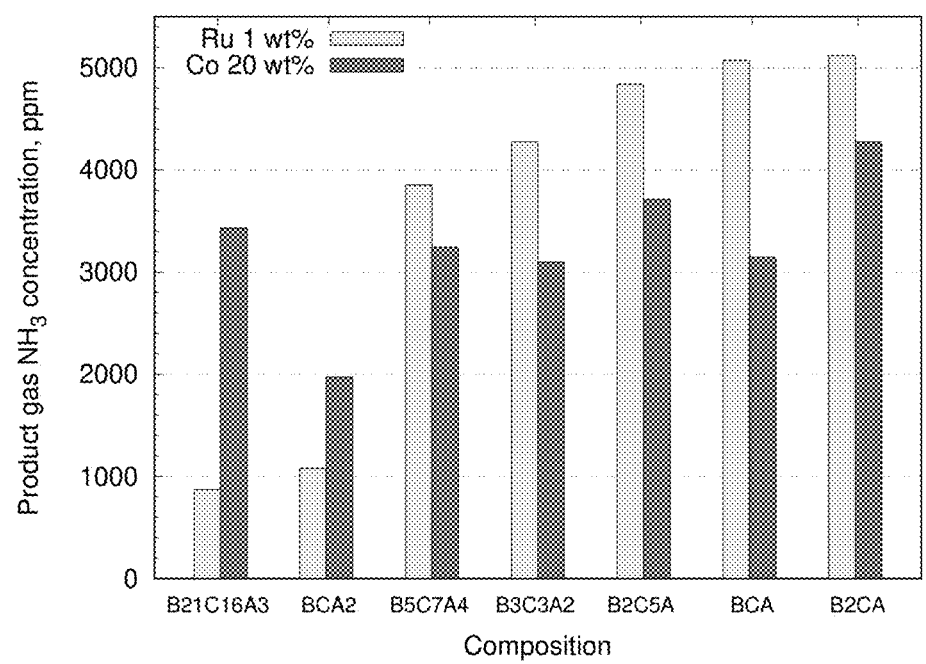
FIG. 10 compares the $NH_3$ synthesis performance of cobalt-decorated and ruthenium-decorated barium calcium aluminum oxide with different compositions.

FIG. 10 shows the product gas maximum $NH_3$ concentration for each sample. B2CA yielded the highest $NH_3$ concentration for both cobalt and ruthenium decoration.

However, ruthenium-decorated B5C7A4, B3C3A2, B2C5A and BCA produced 75% or more of the $NH_3$ concentration as Ru/B2CA, indicating that they are also good compositions for $NH_3$ synthesis using Ru-decorated barium calcium aluminum oxide. Furthermore, cobalt-decorated B21C16A3, B5C7A4, B3C3A2, B2C5A, and BCA produced 75% or more of the $NH_3$ concentration as Co/B2CA, indicated that they are also good compositions for $NH_3$ synthesis using Co-decorated barium calcium aluminum oxide.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method of cracking $NH_3$ into a $N_2+H_2+NH_3$ mixture comprising:
    exposing $NH_3$ to a catalyst comprising barium calcium aluminum oxide decorated with a catalytic species;
    wherein the catalytic species comprises one or more selected from the group consisting of ruthenium, cobalt, and cobalt oxide.

2. The method of claim 1 wherein the barium calcium aluminum oxide decorated with catalytic species to which the $NH_3$ is exposed is bonded to a metal monolith.

3. The method of claim 2 wherein the metal monolith is heated by passing an electric current therethrough while the $NH_3$ is exposed to the catalyst.

4. The method of claim 1 wherein the barium calcium aluminum oxide is selected from the group consisting of $Ba_{21}Ca_{16}Al_6O_{46}$, $BaCaAl_2O_6$, $Ba_5Ca_7Al_8O_{24}$, $Ba_3Ca_3Al_2O_{12}$, $Ba_2Ca_5Al_2O_{10}$, $BaCaAl_2O_5$, and $Ba_2CaAl_2O_6$.

5. The method of claim 1 wherein the catalyst species comprises ruthenium and cobalt, ruthenium and cobalt oxide, or ruthenium, cobalt and cobalt oxide.

6. The method of claim 1 wherein aluminum oxide in the barium calcium aluminum oxide is partially or fully replaced with boron oxide.

7. A method of synthesizing $NH_3$ from a $N_2+H_2$ mixture comprising:
    exposing $N_2+H_2$ to a catalyst comprising barium calcium aluminum oxide decorated with a catalytic species;
    wherein the catalytic species comprises cobalt.

8. The method of claim 7 wherein the barium calcium aluminum oxide decorated with catalytic species to which the $N_2+H_2$ is exposed is bonded to a metal monolith.

9. The method of claim 8 in wherein the metal monolith is heated by passing an electric current through it while the $N_2+H_2$ is exposed to the catalyst.

10. The method of claim 7 wherein the barium calcium aluminum oxide of the catalyst is selected from the group consisting of $Ba_{21}Ca_{16}Al_6O_{46}$, $BaCaAl_2O_6$, $Ba_5Ca_7Al_8O_{24}$, $Ba_3Ca_3Al_2O_{12}$, $Ba_2Ca_5Al_2O_{10}$, $BaCaAl_2O_5$, and $Ba_2CaAl_2O_6$.

11. The method of claim 7 wherein aluminum oxide in the barium calcium aluminum oxide is partially or fully replaced with boron oxide.

* * * * *